May 21, 1929.   A. E. OSWALD   1,713,617
ELECTRIC MOTOR
Filed Dec. 13, 1922   3 Sheets-Sheet 1

Inventor:
Alfred E Oswald
by O. B. Stickney
Attorney

May 21, 1929.  A. E. OSWALD  1,713,617
ELECTRIC MOTOR
Filed Dec. 13, 1922   3 Sheets-Sheet 3

Inventor:
Alfred E Oswald
by  C C Stickney
Attorney

Patented May 21, 1929.

1,713,617

UNITED STATES PATENT OFFICE.

ALFRED E. OSWALD, OF BOGOTA, NEW JERSEY, ASSIGNOR TO UNDERWOOD ELLIOTT FISHER COMPANY, OF NEW YORK, N. Y., A CORPORATION OF DELAWARE.

ELECTRIC MOTOR.

Application filed December 13, 1922. Serial No. 606,575.

This invention relates primarily to motors which are alterable for use with either alternating or direct current, and to work in circuits having different frequencies, etc.

To render the speed of the motor uniform under various conditions of load when it is used with alternating current, there are provided auxiliary coils (preferably stationary) in the commutator circuit. When the motor is altered for use with direct current, the auxiliary coils may be used as an additional part of the field.

Owing largely to currents generated by the field magnet in the armature of the motor, there results objectionable sparking at the brushes when a large motor is used with alternating current, and one of the objects of the invention is to provide means to minimize or avoid this difficulty, without causing an objection when the same motor is used with direct current.

To minimize or avoid the sparking when used with alternating current, I employ a supernumerary pair of brushes, which may be stationed at opposite sides of the commutator, midway between the ordinary brushes. These brushes may be connected to short-circuit the induced currents, and thus avoid the sparking and render it feasible to build large motors for use with either alternating or direct current.

The use of the short-circuiting brushes, for alternating current work, presents a problem, however, when the same motor is used for direct current work, inasmuch as these short-circuiting brushes are located where the magnetism of the field magnets is strongest, that is, centrally of the poles; and this is the place where the electric current in the commutator is strongest, so that sparking (when using the motor for direct current) is apt to be set up by means of these new brushes, the sparks appearing between adjacent segments in the commutator.

In order, however, to obtain the advantage of the brushes for alternating current work, and still produce a motor that will be satisfactory for direct current, the present invention provides for splitting each pole of the field magnet into two portions, and separating the portions, thereby leaving a dead space at a point midway between said portions. These dead points are in places where the novel brushes are located, so that said brushes will be practically idle when the motor is used for direct current. The fact that the field magnet will have four poles, instead of two, does not work to disadvantage for either direct or alternating current. The motor may be used at constant speed under variations of load, for either direct or alternating current.

Another feature of improvement relates to the construction of the annular laminated field magnet for the motor. U-shaped punchings, each having a V-point on one arm and a V-recess on the other arm, are placed upon one another to build up one-half of the annulus. Every alternate punching is reversed, so that in the assembly the points alternate with the recesses. The build-up halves of the magnet may then be assembled and form dovetail joints, the points of each half fitting in the recesses of the other half, making an excellent magnetic joint, safeguarding the magnet against ordinary rough usage, and permitting the poles to approach closely to the armature with reduced liability of collision.

Another feature of improvement relates to the placing of the field coils in such relation to the cleft pole-pieces of the field magnet as to balance or take care of armature reactance, this feature having special benefit where the field coils are to be connectible in either series, or parallel, or multiple series.

There is also illustrated a manner of converting the motor into an alternating current transformer, whereby a single structure can be used for an additional variety of purposes.

Other features and advantages will hereinafter appear.

In the accompanying drawings,

Figure 2ª is a view similar to Figure 2, but showing at one end of the magnet one coil placed upon the pole-piece and the other coil placed upon the neck; the lower portion of the magnet and coils being similar.

The motor-shaft is seen at 40, carrying an armature 41, comprising standard windings suitable for alternating current. It may be drum wound, such as usual in a bi-polar or similar universal motor. Said shaft is journaled in bearings carried by the framework, which comprises a barrel, drum or casing 46. The armature is provided with a commutator 47 to co-operate with usual main brushes 48, which are placed midway between field poles of opposite polarity, and are used for connecting the armature winding through the commutator to the line circuit.

Figure 1:
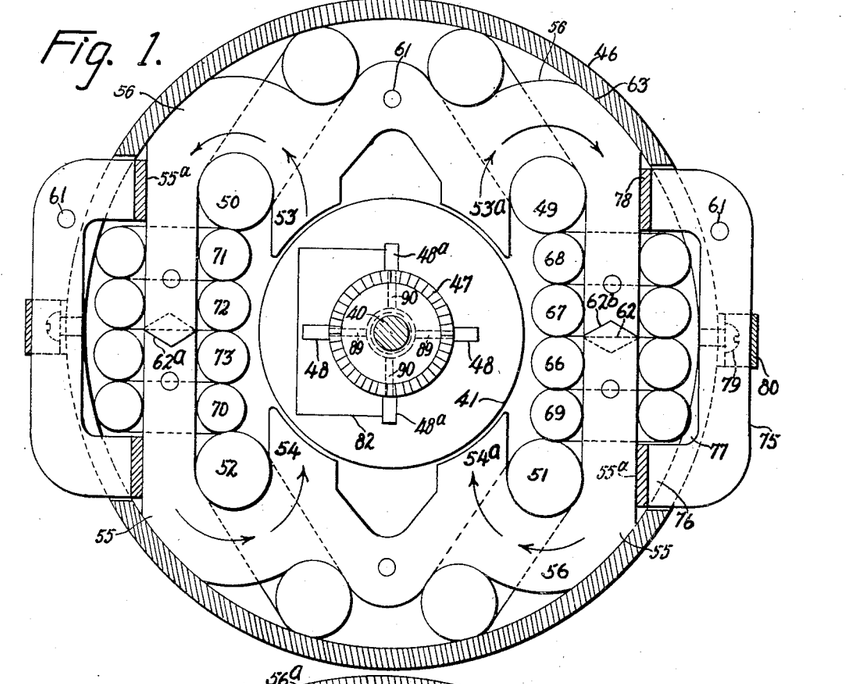
Figure 1 is a diagrammatic elevation of a motor embodying the present improvements in one form, the frame and certain parts being shown in section.
Figure 2:
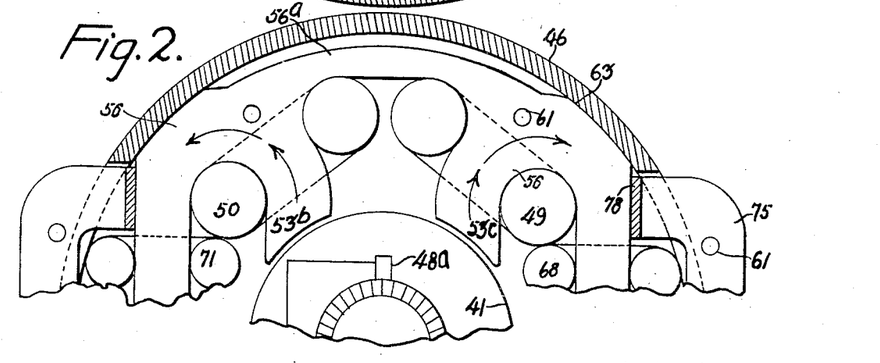
Figure 2 is a sectional elevation of the upper portion of a motor embodying certain of the improvements in another form, with the field coils placed directly upon the pole-pieces, instead of upon the necks of the field magnet as at Figure 1.

The field coils are marked 49, 50, 51, 52, preferably two at each end of a magnet 55, and preferably capable of connecting in either series or parallel or series-parallel at each pole. A split or double pole 53, 53ª, Figure 1, or 53ᵇ, 53ᶜ, Figure 2, is formed at one end of the magnet, which is roughly of annular or continuous form; said magnet also comprising a split pole 54, 54ª, at its opposite end. The pole-pieces are placed close to the armature and extend around the same. Said split or cleft pole-pieces extend from neck-portions 56 provided upon the magnet, and in Figure 2 said field coils 49—52 are arranged at said neck-portions; but, in place of arranging the field coils conventionally around a neck, they may be divided into sub-coils or portions, as shown at Figure 1 and each portion may be placed with one of its sides occupying a position between one of the pole members and the body-portion of the magnet.

The commutator connects the rotating armature in series with auxiliary coils 66, 67, 68, 69, 70, 71, 72, 73, which may be stationary and keep the speed uniform.

When the motor is being used for direct current, the entire annulus forms a single magnet, inasmuch as all the field coils and auxiliary coils produce magnetism in the same direction; but, when the motor is used for alternating current, the field coils are electrically opposed by auxiliary coils 66—73, all coils being placed upon the same iron ring or core 55. The auxiliary coils 66—73 taken together form the middle or neutral portion of the annulus into a separate magnet, which works against the magnets formed by the field coils 49—52, so that the annulus consists of six magnets. The magnetic circuits are not completed through said iron core, but return paths for the magnetic circuit are provided by laminated iron loops or by-passes 75 in the form of keepers, which may be conveniently mounted outside of the cylindrical motor-casing and provided with projections 76 that extend within slots 77 formed in the casing, and they may be held against wooden or other non-magnetic insertions 78 by means of screws 79 and straps 80, the straps passing across the laminations of the keepers and the screws being threaded into the casing. Adjustment of the keepers may be towards and away from the annular magnet, and may be secured by substituting thinner or thicker insertions 78 and tightening up the screws 79. It will thus be seen that there are provided branches or loops of iron 75 extending around the auxiliary coils 66 to 73, whereby the metallic magnetic circuits are made more nearly complete. The loops or keepers may form separate magnets, although only affording a return for the magnetism of the annular magnet. The magentic circuit for each auxiliary coil includes one of the branches or loops 75, and also includes that part of the main core 55 around which the auxiliary coil is wound; while the magnetic circuit for the field coils 49—52 consists partly of the main core 55 and partly of said branches or loops 75. In said loops the direction of the magnetism is the same for the coils which oppose each other.

It will be understood that the magnetic circuits through the loops are left incomplete, the air gaps serving as magnetic impediments. The inductance is kept down to the desired point. Since each loop 75 is included in two magnetic circuits, the effect of the gap at 78 is the same upon one magnetic circuit as upon the other. The gaps offer the same resistance to the field magnetism that they offer to the armature circuit magnetism (excited by the auxiliary coils).

In an alternating circuit, at each change or reversal of the current, there is a momentary zero electromotive force in the circuit. At the same time there is some residual magnetism in the laminated iron field of the motor. Such magnetism causes a direct current or C. E. M. F. to be momentarily generated by the armature, which, of course, is revolving by momentum at the moment that zero electromotive force occurs in the motor circuit. This current, as it is generated by the armature, passes through the auxiliary coils and into the line. In this respect there is therefore a momentary resemblance to the C. E. M. F. effect of a direct current motor. It will be borne in mind that when the armature, revolving by momentum, momentarily so sends current back into the line, there is a certain amount of work performed by the temporarily idling armature. The performance of such work, of course, tends to check or dampen the rotation of the armature momentarily, that is, while the electromotive force in the main circuit is around zero.

This oft-recurring condition tends to preserve uniformity of rotation of the armature under varying conditions of load. The view may be taken that the total load carried by the motor is made up partly of the work that it does in often sending a momentary current back into the line, and partly of the work which forms the output of the motor. If the output portion of the total load is doubled, the motor tends to slow down, and hence there is reduction in the amount of the work which the motor is called upon to perform in generating C. E. M. F. The decrease of speed and the decrease of the C. E. M. F work done by the armature continues, and more and more of the power from the line is diverted to carrying the increase of load that was put upon the motor, until the rate of rotation is reduced to a point below which it will not go. This point, however, is still near the rate at which the motor was originally running under the small load. Thus, the motor continues to operate at nearly or substantially constant speed, with varying loads, using an alternating current.

In the present motor the connection of the series field coils is reversed as compared with the connection of the auxiliary coils that are connected in series with the armature.

It is presumed that such impulses of direct-current as momentarily generated by the idling armature are not lost, but are delivered directly back on the line, and finally opposed and overpowered by the electromotive force of the next reversal of the alternating current.

Variations in speed of the motor are automatically confined within narrow limits, at about the point that is predetermined by the construction or connections of the motor.

It is also noted that a tendency of the armature to over-speed and thereby reduce the inductance, has the effect of permitting more current to flow from the mains through the armature circuit, and as a result more current flows from the mains through the field circuit, the condition being analogous to that in a transformer.

The division of the field windings into two coils at each pole of the magnet favors the proper operation of the motor with alternating current, inasmuch as the magnetism generated by the two coils may be equal, and hence the bodies of the magnets extending in opposite directions from said coils may be equally affected, thus assuring proper co-operation or balance of the field coils 49—52 with respect to auxiliary coils which are designated as 66 to 73 and are placed midway between the pole pieces of the magnet.

The speed of the herein-disclosed motor may be varied, and may be maintained substantially constant for the rate at which it is set, whether without load or with any load up to the maximum.

To provide a constant speed alternating motor that can be successfully used for direct current, all the coils may remain, but the connections may be rearranged so that the auxiliary coils 66—73 in series with the armature through the commutator are connected (reversely) across the mains, while the field coils 49—52 are also connected across the mains, or in shunt around the armature and the auxiliaries.

The motor is wound or constructed for alternating current, and therefore contains less armature turns (for keeping down the inductance) than if wound only for direct current operation at the same speed. The armature turns are less in number than is desirable for use in the ordinary way with a direct current, say 110 volts, when the same speed is desired on direct as on alternating current. For this reason, the aforesaid auxiliary coils are connected up (for direct current) to give part of the field magnetism, these coils being in series with the armature and offering substantial resistance, thereby reducing the voltage consumed by the armature. Thus, the auxiliary coils, although in series with the armature, may really operate as field coils in conjunction with the shunt field coils, and give a good starting torque. The magnetism of the field is thus augmented, and the main field coils, being in shunt around the armature, prevent the latter from over-speeding. The magnetic iron loops do not function on direct current. The auxiliary coils and field coils may be re-connected in parallel and multiple series, respectively, where a very low voltage is employed.

Midway between field poles of the same polarity, or about 90 degrees from the main brushes 48, are placed anti-sparking brushes 48ª, connected by a conductor 82 for short-circuiting the induced current in the armature winding. This minimizes or eliminates the sparking that would otherwise occur in a large motor at the main brushes 48, when used with alternating current.

These two sets of brushes may be mounted upon individually adjustable supports. This permits the short-circuiting brushes to be moved to any desired position with reference to the field magnet; and one brush or set of brushes may be adjusted in respect to another brush or set of brushes.

The difficulty arises that, when the motor is used with direct current (since each short-circuiting brush touches a plurality of segments at one time, and since the coils connected thereto have a higher voltage induced in them than in any other two adjacent segments), the brushes 48ª short-circuit such coils, thereby causing sparking when the armature segments leave the brushes. Since it is not desired to remove the brushes 48ª when the motor is to be used on direct current, the described difficulty of short-circuiting at this time may be minimized or prevented by use of a field magnet having specially-shaped cleft pole-pieces, to give the magnet the form of a four-pole magnet, although it operates as a bi-polar magnet in which each pole is cut away in the middle. In other words, two similar poles or pole-pieces 53, 53ª (acting as one pole) are substituted in place of a single pole; the opposite similar pole-pieces being designated as 54, 54ª. In other words, the pole-pieces 53 and 53ª are of the same polarity, which is opposite from the polarity of the pole-pieces 54 and 54ª.

Figures 2A, 3, 4:
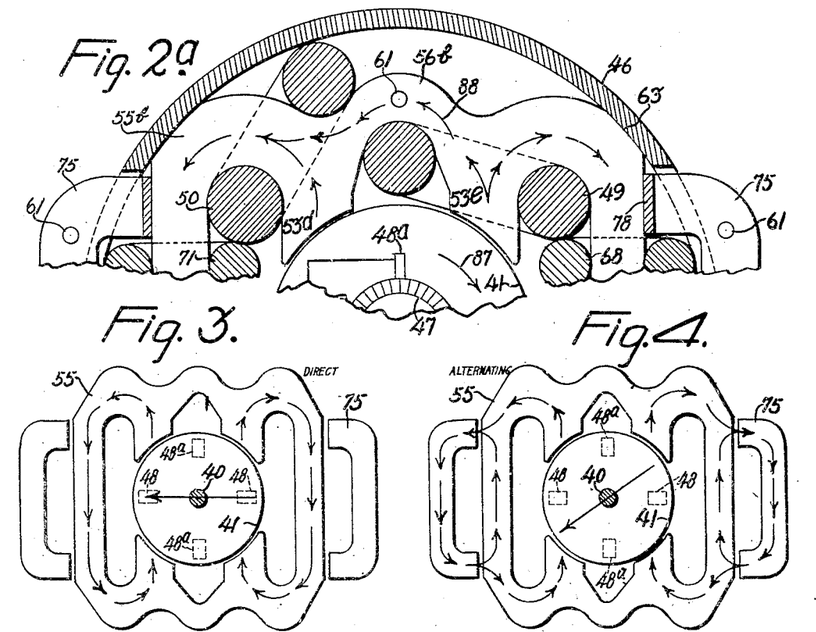
Figure 3 is a diagram to illustrate the magnetic circuits when the motor shown at either of Figures 1, 2 and 2ª is used with direct current.
Figure 4 is a similar diagram, but showing the circuits with alternating current.

The poles of the same polarity are placed less than 90 degrees apart, because the armature in alternating current work assumes a similarity to the armature of a repulsion motor; that is, the resultant magnetic field of the armature assumes a position between the main brushes and the sparking brushes, or at a position of about 45 degrees. It is not desired for the resultant magnetic field of the armature to come to the middle of one of the pole-pieces, and hence the pole-pieces of like polarity are brought nearer together. Thus the tips of the pole-pieces more nearly coincide with the resultant magnetic field in the armature (see arrows at Figure 4).

Such coils as are connected to the segments that are located under the short-circuit brushes in direct current are not the coils that have the maximum voltage induced in them, since they are directly in the open cleft or cutaway between the portions of the pole; and hence no sparking will exist at the short-circuiting brushes, or it will at least be minimized.

Viewed in one way, the field magnet may thus be considered as a four-pole magnet having adjacent portions of the same polarity placed less than 90 degrees apart operating as a bi-polar magnet, and suitable for either kind of circuit.

The field magnet may be made up of laminations, each comprising two similar segments or punchings. The laminations of the field magnet are held together by rivets 61. The neutral ends of the field-magnet punchings are seen at 62ª, 62ᵇ. A method is employed of dovetailing the ends at this joint. Each of the punchings has one of its tips pointed at 62ª, and the other provided with a corresponding V-shaped recess 62ᵇ.

Each single field punching (roughly of U-shape) is placed tip to tip against its companion, one punching being reversed so that it will match joints with the other. One-half of the magnet may be made up by alternating or reversing each lamination to obtain the desired height or thickness of the magnet. When assembled to the similarly formed other half of the magnet, the two halves of the magnet dovetail together, as at Figure 1, the points in each complete lamination overlapping those in the next. This makes a good magnetic joint, and also prevents any hard blow suffered by either the casing 46 or the keeper 75 from moving either half of the field magnet out of its proper relative position, and the armature and field pole-pieces are prevented from colliding.

The four faces on the field magnet are represented at 55ª, and are located opposite the projections 76 on the keeper 75.

The field coils 49—52 may be slipped over the neutral ends of the laminated field-magnet halves before the magnet is assembled in the casing. The two magnetic poles of like polarity are produced jointly when the magnetism is produced by the field coils. The pole-pieces of the same polarity are separately excited by the individual field coils, which are assembled directly over each pole-piece.

The neck-portion 56 of the field magnet 55 at Figure 1 lies inside of the field coils. At Figure 2 the neck-portion of 56ª lies outside of the field coils.

As an example of possible variations within the scope of the invention, it may be said that the field-magnet punchings are not limited to the designs shown, but also include punchings shaped to accommodate the field coils in either of the positions at Figures 1 and 2; part of the field coils may be assembled as in Figure 1, and the remaining field coils as in Figure 2, in the same motor.

The field coils in shunt around the armature are capable of being connected in series, parallel or multiple series connections.

The coils 66 to 73 are placed over the neutral ends of the magnet and partly surrounded by the laminated iron keeper 75.

Figure 6:
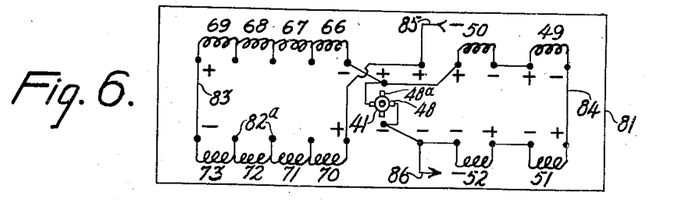
Figures 6, 7, 8, 8ª and 9 illustrate different ways of connecting up various coils to alter the motor for a variety of uses with direct and alternating currents of a variety of voltages and frequencies, etc.

At Figure 6 is represented diagrammatically a plate or board 81, upon which may be mounted the terminals for various coils and circuits. The coils may be connected up in various ways to secure different speeds and to adapt the motor for different circuits. When connected up as illustrated at Figure 6, the motor may be used on direct current, say 110 volts. There may be employed for the terminals bolts or screws 82ª. The motors may be manufactured alike for all circuits and speeds, but in the final stage of production of each motor, its terminals may be connected in any manner by means of wire-jumpers, or otherwise, in order to adapt the motor to its particular speed and circuit, as illustrated for example at Figures 6 to 10. The various coils and armature may also be otherwise connected in order to secure any required operation of the motor. If desired, the terminals may at any time be disconnected from one another, and then connected by jumpers, or otherwise, into some new arrangement, whereby the motor is altered to suit a different use or circuit or to have a different speed, etc. At Figure 6 the motor is shown connected up to produce a short shunt compound wound motor, where the auxiliary coils 66 to 69 are connected each to the next, and a jumper 83 connects 69 to 73, the latter being connected to 72, 71 and 70, and all of these coils being in series with the armature 41. The field coils 49 to 52 are connected in series, and arranged directly across the line, or in shunt around the armature. A jumper 84 connects 49 with 51.

Figure 7:
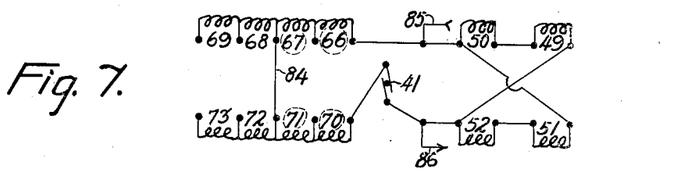

Figure 7 illustrates various coils re-connected in a manner to permit the use of the motor on a 25 cycle alternating current circuit at say 110 volts. The shunt field coils 49 to 52 are connected in multiple series directly across the line, which is indicated at 85, 86, while four of the auxiliary coils 66, 67, 70 and 71 are reversely connected in series with one another and are in series with the armature 41. In this view certain coils are marked with circles, to indicate that the current passes through them in reverse direction as compared with Figure 6. At Figure 7 a jumper-wire 84 connects the coils 67 and 71; the coils 68, 69, 72, 73 being idle.

Figure 8:
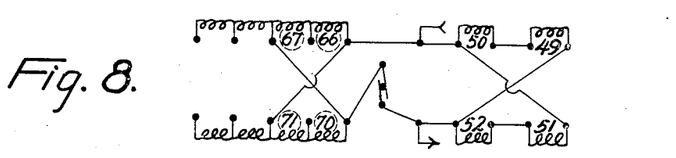
Figure 8A:
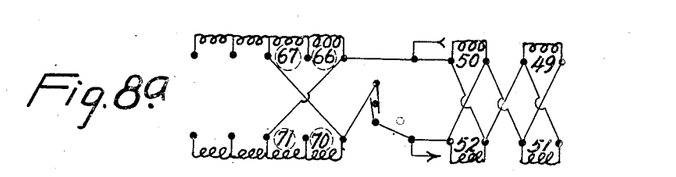

At Figure 8 the armature and coils are shown re-connected to permit the use of the motor on a 40 cycle alternating current circuit, say 110 volts; the shunt field coils 49 to 52 being connected in multiple series and across the line, while four of the auxiliary coils 66, 67, 70 and 71 are connected reversely and also in multiple series with one another and then in series with the armature. The constant speed value of the motor armature may be considered as approximately the same in Figure 8 as in Figures 6, 7 and 9.

At Figure $8^a$ the motor is shown connected for 110 volts, 50 cycles. The field coils are connected in parallel (the same as for 60 cycles), while the auxiliary coils are placed two in series and two sets in parallel (the same as for 40 cycles), and then reversely connected in series with the armature.

Figure 9:
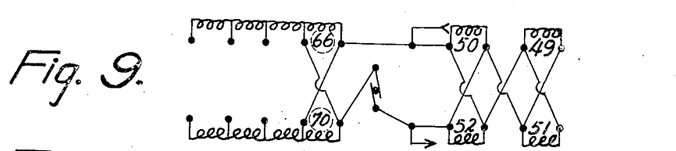

Figure 9 illustrates the armature and coils connected or re-connected for using the motor on a 60 cycle alternating current circuit, 110 volts. The shunt field coils 49 to 52 are all connected in parallel across the line, while only two of the auxiliary coils 66 and 70 are in use; these two being connected reversely in parallel and then connected in series with the armature.

In the form of the invention seen at Figure $2^a$ the field coil 49 is mounted directly over the field pole $53^e$, similar to Figure 2, while the field coil 50 is mounted similar to Figure 1. An object of such a combination is to balance or take care of the armature reactance.

Considering the armature rotation as right handed, as shown by arrow 87, and the position of the field coils as shown either by Figure 1 or Figure 2, then it follows that the armature reaction upon the field magnet would cause the field pole $53^d$ to be of a greater strength than the field pole $53^e$, even though coils 49 and 50 have the same number of turns and are of similar resistance.

Since such a motor, when operating on alternating current, would have a magnetic combination between armature and field similar to that of a repulsion motor, it is desired to have the field poles $53^d$ and $53^e$ of similar strength, to favor the best results. To this end the field coils are placed on the field magnet $55^b$, as shown in Figure $2^a$, so that all of the magnetism produced by coil 49 passes through the field pole $53^e$, which at Figures 1 and 2 is the weakest field pole; while at Figure $2^a$ the field coil 50 is so placed that all magnetism that is produced by such a coil does not pass through the field pole $53^d$ (which at Figures 1 and 2 is the strongest field pole), but has a by-pass as indicated by the arrow 88. The other arrows indicate the directions of the magnetism through the field coils. The lower half of the motor corresponds with the upper portion seen at Figure $2^a$.

Usually the armature reaction upon the field poles is taken care of by winding the different coils with more or less turns. For example, at Figures 1 or 2, the coils 49 and 52 (which are inclined to be the weakest) could be wound with more turns, when all coils are to be connected in series, or with less turns (of less resistance) when all coils are to be connected in parallel; while coils 50 and 51 (which are inclined to be the strongest if the armature rotates to the right) could be wound with less turns when all coils are to be connected in series, or with more turns (of more resistance) when all coils are to be connected in parallel. It will be understood, however, that it is not desirable to place such differently wound coils as at Figures 1 and 2, if they are to be connectible in either series, or parallel, or mutliple series, and therefore the arrangement at Figure $2^a$ has been devised for taking care of armature reactance.

The function of the neck portion $56^b$ of the field magnet $55^b$ is to form a magnetic by-pass, which will have a tendency to strengthen the field pole $53^e$ and weaken the field pole $53^d$, thus opposing the tendency of the armature reaction. Hence the field poles may have approximately equal strength. The corresponding neck portions at Figures 1 and 2 are not necessary except to serve as a mechanical connecting or supporting means. The armature at Figures 1 and 2 can be rotated in either direction. The armature in Figure $2^a$ can also be rotated in either direction, but the best result is obtained when rotated only in one direction, as indicated by the arrow 87.

The main brushes 48 are shown individually adjustable around the commutator 47 upon conventionally-indicated swing-arms 89, Figure 1; and the short-circuiting brushes may also be adjustable upon swing-arms 90. Each brush may be moved to any suitable position with reference to the field magnet; and the short-circuiting brushes may also be adjusted with reference to the main brushes. If the short-circuiting brushes are omitted from the alterable motor, in some cases, the main brushes may be shifted back about 22½ degrees against the direction of armature rotation, which position is practicable for use of the motor with direct current; and, if desired, in order to reduce sparkling still more (the short-circuiting brushes being omitted), the armature may have two or more separate insulated windings, the connections to the commutator being such that every other commutator segment will constitute part of one circuit, the intervening segments being in another circuit, and the main brushes not touching more than two segments at any time.

The improvements are not limited to bipolar motors, as the improvements may be applied also to four-pole machines, six-pole machines, etc., with armatures wound accordingly, within the scope of the invention.

Figure 5:
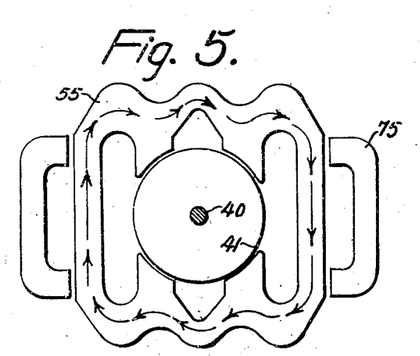
Figure 5 is a similar diagram to show the magnetic current when the device is altered into a transformer.
Figure 10:
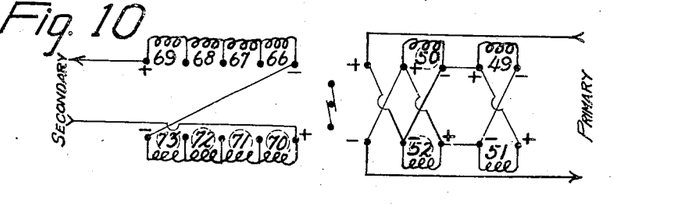
Figure 10 is a diagram to illustrate the manner of connecting up the field and auxiliary coils for use as a transformer; the armature being out of use or omitted at this view.

At Figure 10 there is illustrated diagrammatically the manner of connecting up field and auxiliary coils to form a transformer. If desired, the armature and the keepers 75 may be removed from the machine, although if allowed to remain they will not seriously impair the efficiency of the transformer. The motor-field coils 49—52 are connected to form the primary of the transformer. As shown, all of these coils may be connected in parallel and across the line, but the coils 50 and 52 are connected in a reversed manner, so as to obtain a magnetic field as shown at Figure 5. The primary in the variety shown at Figure 10 would be suitable for use on circuits of from 25 to 60 cycles without change, and say at 110 volts. The secondary coils 66—73 at Figure 10 are all connected in series, the coils 70 to 73 being connected in a reverse manner. If each of the shunt coils contains 1200 turns of wire, and if the total number of turns for all of the auxiliary coils is 600, then the secondary voltage will be 55, at the same frequency as is supplied to the primary. The coils may be connected otherwise, as for example to form an auto-transformer. The coils may also be connected in series or in multiple-series; or the primary may be used as the secondary, as long as the magnetic circuit is preserved (see Figure 5).

In connection with the method of preventing overspeeding of the alternating current motor, a few well-known principles may be borne in mind, viz, that a series motor will not generate direct current (the armature still rotating in the same direction), unless either (but not both) the armature circuit or the series field circuit be reversed. In this case, there may be considered only the reversal of the series field coils as connected in series with the armature (because such an arrangement compares with the auxiliary coils as connected with the armature when motor is operated on an alternating current circuit). Considering therefore an alternating current circuit, in which the current continuously and periodically alternates or reverses, during which cycle or operation, at change from each reversal the alternating current circuit has a zero potential, it will be understood that it is at around this time that the following conditions occur: considering that there is still some residual magnetism remaining in the laminated iron field when the alternating current circuit has a zero value, such magnetism could generate at that time in the armature a direct current, which when passing through the auxiliary coils (as connected in a reversed manner for alternating current motors) gives an ideal momentary arrangement of a direct current series generator, which generative condition tends to check or dampen the rotation of the armature momentarily at that particular time. Such impulses of direct current as generated under the conditions are not lost, as they are delivered directly back on the line, and finally opposed and overpowered by the electromotive force of the next reversal of the alternating current; and thus the motor continues to operate at a constant speed on an alternating current circuit.

Variations may be resorted to within the scope of the invention, and portions of the improvements may be used without others.

Having thus described my invention, I claim:

1. An alternating current motor comprising an armature coil, a commutator, brushes, field coils in shunt around the armature coil, auxiliary coils connected in series with the armature, but reversely connected as compared with the connection of the shunt field coils, and the auxiliary and field coils co-operating to effect automatic regulation of the motor speed, and supernumerary brushes at opposite sides of the commutator between said brushes, said supernumerary brushes connected to short-circuit induced currents.

2. An electric motor having a commutator and brushes and constructed for use with alternating current and having speed-regulating means including opposed windings, with provision whereby the motor may be altered into a direct current motor, using said windings for its field, and also comprising short-circuiting brushes at opposite sides of the commutator between said brushes to short-circuit the induced currents, said motor comprising field magnets having poles, each pole being cleft, and the short-circuiting brushes being located in the clefts, where said short-circuiting brushes will be idle when the motor is used for direct current.

3. In an electric motor, the combination of the armature coil, a shunt field coil, an auxiliary coil, and means for connecting said auxiliary coil in series with the armature coil and field coil in such different manners of connections respectively that the current passing through the auxiliary coil opposes the magnetizing action of the current passing through the field coil when the motor is operating on alternating current, and helps the magnetizing action of the current passing through the field coil when the motor is operating on direct current.

4. An electric motor including an armature, sets of auxiliary coils in series with the armature, sets of shunt field coils, a commutator, main brushes therefor, a magnet-core having sets of field poles, the poles in each set being of the same polarity, auxiliary brushes at opposite sides of the commutator, each auxiliary brush located midway between field poles of the same polarity, and means connecting said auxiliary brushes, the field and auxiliary coils being placed on said magnet-core, the sets of auxiliary coils being placed between the sets of field coils, and the auxiliary coils electrically connected to oppose the field coils.

5. An electric motor having a commutator and brushes and constructed for use with alternating current and having speed-regulating means including opposed windings, with provision whereby the motor may be altered into a direct current motor, using said windings for its field, and also comprising short-circuiting brushes at opposite sides of the commutator between said brushes to short-circuit the induced currents, said motor comprising field magnets having poles, each pole being cleft, and the short-circuiting brushes being located in the clefts, where said short-circuiting brushes will be idle when the motor is used for direct current, said short-circuiting brushes being disposed about midway between the first-mentioned brushes.

6. In an electric motor, the combination with an armature, of a field structure having provision for minimizing field distortion, said structure including an iron field-magnet annulus forming with said armature a magnetic circuit, said annulus including field poles of opposite signs spaced around the armature, each field pole formed by two salients separated by a cleft, the salients of each pole having pole-faces of the same sign adjacent said armature and being joined at the opposite end of said cleft by a neck, said annulus being completed by loops joining the pairs of salients and branching therefrom from points substantially opposite the necks, field-coils, one coil for each pole and surrounding the salient thereof in which the tendency is toward lesser flux density due to armature reaction, said coil surrounding said salient so that substantially all the magnetism produced by said coil passes therethrough to assist said salient in restraining the tendency of the lines of force to be diverted therefrom, and other field-coils, one for each pole and surrounding an adjacent loop so that only a part of the magnetism produced by the latter coil passes through the other salient of said each pole in which due to said armature reaction the tendency is toward greater flux density, another part of the magnetism of the latter one coil having a by-pass through the salient-joining neck to thereby weaken said other salient in which the tendency is toward greater flux density, and reinforce the salient in which the tendency is toward lesser flux density.

7. In an electric motor, the combination with an armature, of a field-structure having provision for minimizing field-distortion, said structure including an iron-field-magnet member forming with said armature a magnetic path, said member including a field-pole, formed by two salients separated by a cleft, said salients having pole-faces of the same sign adjacent said armature and being joined at the opposite end of said cleft by a neck, said member also including a branch extending from the salient in which the tendency is toward greater flux density due to armature reaction, said branch extending from a portion substantially opposite said neck, a field-coil surrounding the other salient so that substantially all the magnetism produced by said field-coil passes through said other salient to assist said other salient in restraining the tendency of the lines of force to be diverted therefrom, and a second field-coil surrounding said branch so that only a part of the magnetism produced by said second coil passes through the salient from which said branch extends, another part of said latter magnetism having a by-pass through said salient-joining neck to thereby weaken the salient in which the tendency is toward greater flux density and reinforce the salient in which the tendency is toward lesser flux density.

8. An electric motor including an armature, a commutator, main brushes therefor, a magnet-core having field-poles, each pole including a pair of salients separated by a cleft extending from the pole-face to a neck joining said salients, auxiliary brushes on opposite sides of the commutator, each auxiliary brush located opposite a cleft, means connecting said auxiliary brushes, and pairs of field-coils, one pair of coils for each pole, one coil of each pair surrounding the salient in which due to armature reaction the tendency is toward lesser flux density, said coil surrounding said salient so that substantially all the magnetism of said coil assists said salient in restraining the tendency of the lines of force to be diverted therefrom by said armature reaction, the other coil of each pair being disposed on said magnet-core in such position that only part of its magnetism passes through the other salient and another part of said latter magnetism has a by-pass through the salient-joining neck, thereby to weaken said other salient in which the tendency is toward greater flux density and reinforce the salient in which the tendency is toward lesser flux density, said magnet-core having provision for disposing said other coil as aforesaid.

ALFRED E. OSWALD.